US012233807B1

(12) United States Patent
Patel et al.

(10) Patent No.: US 12,233,807 B1
(45) Date of Patent: Feb. 25, 2025

(54) VEHICLE AIRBAG ASSEMBLY

(71) Applicant: Ford Global Technologies, LLC, Dearborn, MI (US)

(72) Inventors: Deepak Patel, Canton, MI (US); Zhibing Deng, Northville, MI (US); Joseph E. Abramczyk, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/791,890

(22) Filed: Aug. 1, 2024

(51) Int. Cl.
*B60R 21/207* (2006.01)
*B60R 21/013* (2006.01)
*B60R 21/205* (2011.01)
*B60R 21/26* (2011.01)
*B60R 21/00* (2006.01)

(52) U.S. Cl.
CPC .......... *B60R 21/207* (2013.01); *B60R 21/013* (2013.01); *B60R 21/205* (2013.01); *B60R 21/26* (2013.01); *B60R 2021/0006* (2013.01); *B60R 2021/0051* (2013.01); *B60R 2021/26094* (2013.01)

(58) Field of Classification Search
CPC .................. B60R 21/207; B60R 21/26; B60R 2021/26094; B60R 21/013
See application file for complete search history.

(56) References Cited

U.S. PATENT DOCUMENTS

| | | | |
|---|---|---|---|
| 5,222,761 A * | 6/1993 | Kaji | B60R 21/231 |
| | | | 280/730.2 |
| 6,425,602 B1 | 7/2002 | Al-Amin et al. | |
| 6,966,576 B1 * | 11/2005 | Greenstein | B60R 21/23138 |
| | | | 280/737 |
| 7,413,220 B2 | 8/2008 | Itoga et al. | |
| 7,591,481 B2 | 9/2009 | McCormick | |
| 7,594,675 B2 * | 9/2009 | Bostrom | B60R 21/207 |
| | | | 280/730.2 |
| 7,976,058 B2 * | 7/2011 | Suzuki | B60R 21/23138 |
| | | | 280/730.2 |
| 10,543,802 B1 * | 1/2020 | Makowski | B60R 21/20 |
| 11,479,200 B1 * | 10/2022 | Gao | B60R 21/20 |

(Continued)

FOREIGN PATENT DOCUMENTS

| | | |
|---|---|---|
| CN | 205059502 U | 3/2016 |
| DE | 102018008893 A1 | 5/2019 |

(Continued)

*Primary Examiner* — Faye M Fleming
(74) *Attorney, Agent, or Firm* — Frank A. MacKenzie; Brooks Kushman P.C.

(57) ABSTRACT

An assembly includes a seat assembly defining a seat-forward direction. The assembly includes a middle console adjacent the seat assembly. The assembly includes a first airbag inflatable from an uninflated position to an inflated position. The first airbag is supported by the seat assembly in the uninflated position and the inflated position. The assembly includes a second airbag inflatable from an uninflated position to an inflated position. The second airbag in the uninflated position and the inflated position is forward of the seat assembly in the seat-forward direction. The assembly includes an inflator supported by the middle console, the inflator operatively connected to the first airbag and the second airbag to provide inflation medium.

18 Claims, 7 Drawing Sheets

(56) References Cited

U.S. PATENT DOCUMENTS

| | | | |
|---|---|---|---|
| 11,884,229 B1* | 1/2024 | Faruque | B60R 7/04 |
| 2008/0061538 A1* | 3/2008 | Mohammad | B60R 21/207 |
| | | | 280/730.2 |
| 2008/0129024 A1* | 6/2008 | Suzuki | B60R 21/23138 |
| | | | 280/743.1 |
| 2015/0108744 A1 | 4/2015 | Line et al. | |
| 2017/0210329 A1 | 7/2017 | Rao et al. | |
| 2020/0062213 A1* | 2/2020 | Gao | B60R 21/013 |

FOREIGN PATENT DOCUMENTS

| | | | | |
|---|---|---|---|---|
| JP | 2963948 B2 * | 10/1999 | | B60R 21/01516 |
| JP | 2017193283 A | 10/2017 | | |
| KR | 100551538 B1 | 2/2006 | | |
| KR | 20070039775 A | 4/2007 | | |

* cited by examiner

# VEHICLE AIRBAG ASSEMBLY

BACKGROUND

A vehicle may include one or more airbags deployable during certain vehicle impacts to control kinematics of occupants inside the vehicle during the impact. The airbag may be a component of an airbag assembly including a housing supporting the airbag, and an inflator in communication with the airbag for inflating the airbag from an uninflated position to an inflated position.

DETAILED DESCRIPTION

Figure 1:
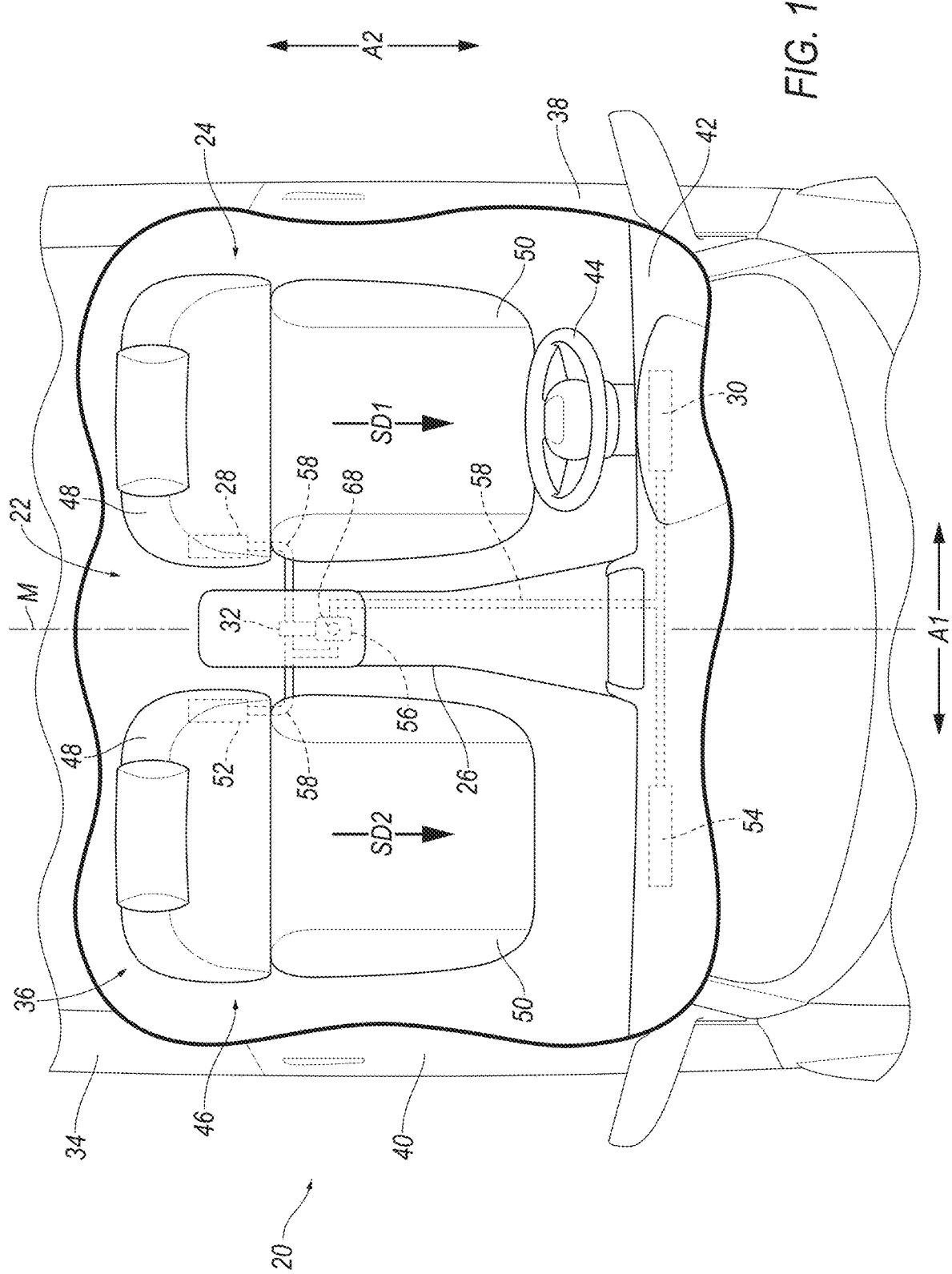
FIG. 1 is a top view of a portion of a vehicle broken away to show a passenger cabin and seat assemblies with first, second, third, and fourth airbags in uninflated positions.

An assembly includes a seat assembly defining a seat-forward direction. The assembly includes a middle console adjacent the seat assembly. The assembly includes a first airbag inflatable from an uninflated position to an inflated position, the first airbag supported by the seat assembly in the uninflated position and the inflated position. The assembly includes a second airbag inflatable from an uninflated position to an inflated position, the second airbag in the uninflated position and the inflated position being forward of the seat assembly in the seat-forward direction. The assembly includes an inflator supported by the middle console, the inflator operatively connected to the first airbag and the second airbag to provide inflation medium.

The assembly may include a valve operatively connected between the inflator and the first airbag and the second airbag, the valve being movable from a first position that fluidly connects the inflator and the first airbag to a second position that fluidly connects the inflator and the second airbag.

The valve at the first position may fluidly disconnect the inflator and the second airbag.

The valve at the second position may fluidly disconnect the inflator and the first airbag.

The assembly may include a computer having a processor and a memory storing instructions executable by the processor to move the valve to the first position or the second position, and to actuate the inflator to provide inflation medium.

The valve may initially be at the first position and the memory may store instructions executable by the processor to, in response to detection of a potential certain impact to a front of a vehicle, move the valve to the second position.

The memory may store instructions executable by the processor to move the valve to the first position when a condition is met and in the absence of detection of a certain impact to the front of the vehicle.

The condition may include passage of a predetermined period of time after the potential certain impact to the front of the vehicle is detected.

The memory may store instructions executable by the processor to, after moving the valve to the second position, actuate the inflator to provide inflation medium in response to detection of a certain impact to the front of the vehicle.

The memory may store instructions executable by the processor to, in response to detection of a potential certain impact to a side of the vehicle, maintain the valve at the first position.

The memory may store instructions executable by the processor to, with the valve at the first position, actuate the inflator to provide inflation medium in response to detection of a certain impact to the side of the vehicle.

The assembly may include an actuator operatively coupled to the valve to move the valve to the first position or the second position.

The assembly may include a bulkhead forward of the seat assembly in the seat-forward direction, the second airbag supported by the bulkhead in the uninflated position and the inflated position.

The second airbag may be a knee airbag.

The seat assembly may include a seat bottom and a seatback, the first airbag supported by the seatback in the uninflated position and the inflated position.

The assembly may include a second seat assembly adjacent the middle console and a third airbag inflatable from an uninflated position to an inflated position, the third airbag supported by the second seat assembly in the uninflated position and the inflated position, and the inflator may be operatively connected to the third airbag to provide inflation medium.

The second seat assembly may define a second seat-forward direction, and the assembly may include a fourth airbag inflatable from an uninflated position to an inflated position, the fourth airbag in the uninflated position and the inflated position forward of the second seat assembly in the second seat-forward direction.

The assembly may include a valve operatively connected between the inflator and the first airbag, the second airbag, the third airbag, and the fourth airbag, the valve movable from a first position that fluidly connects the inflator and the first airbag and the third airbag to a second position that fluidly connects the inflator and the second airbag and the fourth airbag.

With reference to the Figures, wherein like numerals indicate like parts throughout the several views, a vehicle 20 having an assembly 22 to control kinematics of occupants of the vehicle 20 is shown. The assembly 22 includes a first seat assembly 24 defining a first seat-forward direction SD1. The assembly 22 includes a middle console 26 adjacent the first seat assembly 24. The assembly 22 includes a first airbag 28 inflatable from an uninflated position to an inflated position. The first airbag 28 is supported by the first seat assembly 24 in the uninflated position and the inflated position. The assembly 22 includes a second airbag 30 inflatable from an uninflated position to an inflated position. The second airbag 30 in the uninflated position and the inflated position is forward of the first seat assembly 24 in the first seat-forward direction SD1. The assembly 22 includes an inflator 32 supported by the middle console 26. The inflator 32 is operatively connected to the first airbag 28 and the second airbag 30 to provide inflation medium.

Figure 2:
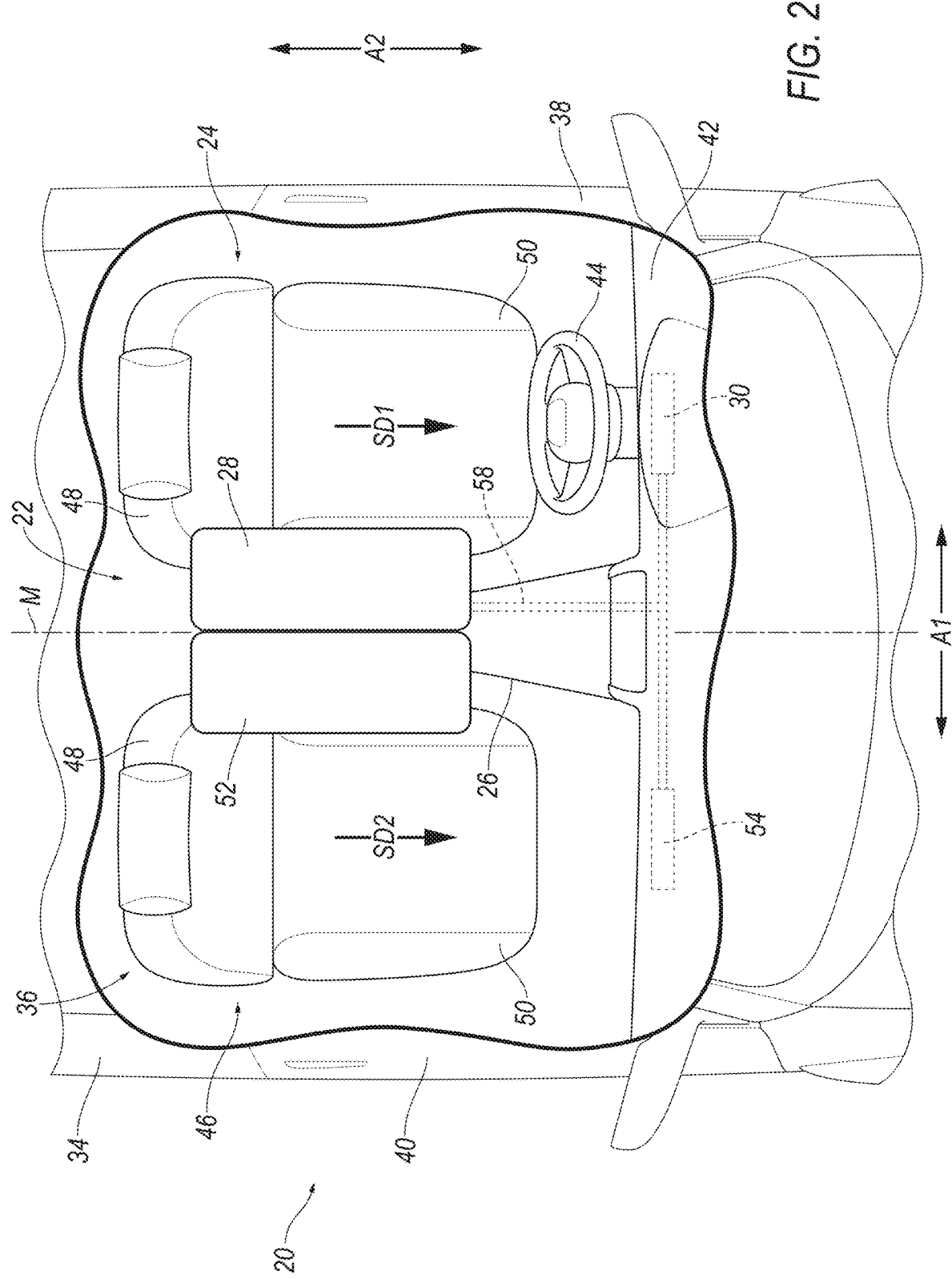
FIG. 2 is a top view of the portion of the vehicle broken away to show the passenger cabin and seat assemblies with the first airbag and the third airbag in inflated positions.
Figure 3:
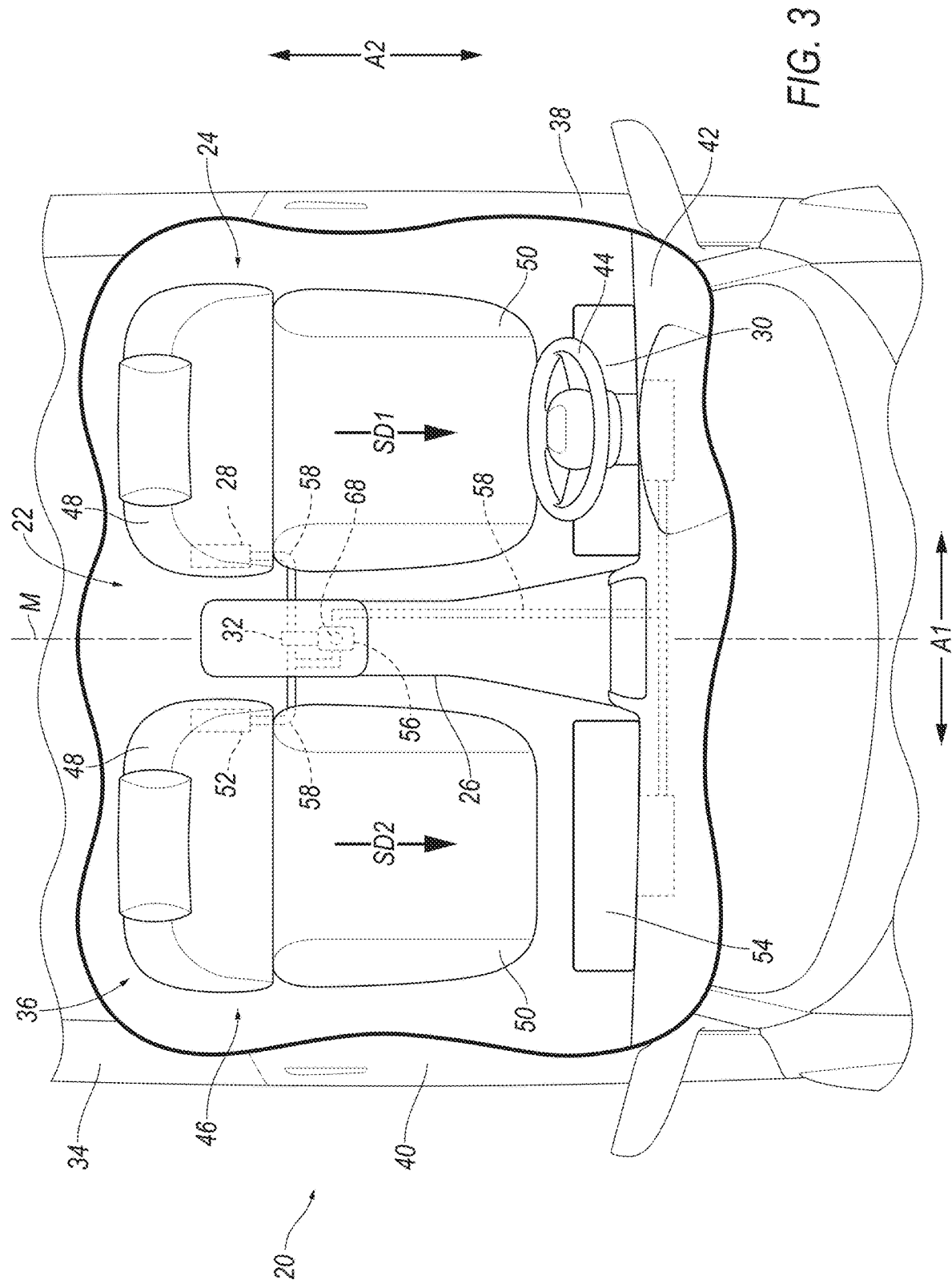
FIG. 3 is a top view of the portion of the vehicle broken away to show the passenger cabin and seat assemblies with the second airbag and the fourth airbag in inflated positions.

With reference to FIGS. 1-3, the vehicle 20 may be any suitable type of automobile, e.g., a passenger or commercial automobile such as a sedan, a coupe, a truck, a sport utility vehicle, a crossover vehicle, a van, a minivan, a taxi, a bus, etc.

The vehicle 20 includes a vehicle frame (not shown) and a vehicle body 34. The vehicle body 34 may be of unitary construction, in which the vehicle frame is unitary with the vehicle body 34 including frame rails, rockers, pillars, roof rails, etc. As another example, the vehicle body 34 and vehicle frame may have a body-on-frame construction (also referred to as a cab-on-frame construction) in which the vehicle body 34 (including rockers, pillars, roof rails, etc.) and vehicle frame are separate components, i.e., are modular, and the vehicle body 34 is supported on and affixed to the vehicle frame. Alternatively, the vehicle frame and vehicle body 34 may have any suitable construction. The vehicle frame and the vehicle body 34 may be of any suitable material, for example, steel, aluminum, and/or fiber-reinforced plastic, etc.

The vehicle body 34 may define a passenger cabin 36 to house occupants, if any, of the vehicle 20. The passenger cabin 36 may extend across the vehicle 20, e.g., from a left side 38 of the vehicle 20 to a right side 40 of the vehicle 20. The passenger cabin 36 includes a front end and a rear end with the front end being in front of the rear end during forward movement of the vehicle 20.

In the example shown in the Figures, the vehicle 20 includes a bulkhead 42 at the front end of the passenger cabin 36. In another example, additionally or alternatively, a bulkhead may be at the rear end of the passenger cabin 36 (not shown). In such an example, the bulkhead 42 at the front and the bulkhead at the rear may be identical or different. The bulkhead 42 is elongated along a vehicle-lateral axis A1. In other words, the bulkhead 42 may be longer along the vehicle-lateral axis A1 than along a vehicle-longitudinal axis A2 or a vehicle-vertical axis (not shown). The bulkhead 42 may extend from a pillar on the right side 40 of the vehicle 20 to a pillar on a left side 38 of the vehicle 20. In other words, the bulkhead 42 may extend completely across the passenger cabin 36 along the vehicle-lateral axis A1. The bulkhead 42 may extend from a floor of the passenger cabin 36 to a front windshield (or rear windshield), e.g., along the vehicle-vertical axis. The bulkhead 42 may include an instrument panel. The instrument panel may include one or more instruments such as gauges, displays, a user interface, etc. The instrument panel may be elongated along the vehicle-lateral axis A1 from the left side 38 of the vehicle 20 to the right side 40 of the vehicle 20. The instrument panel presents information to and may receive information from an occupant of the vehicle 20. The instrument panel may include dials, digital readouts, screens such as a touch-sensitive display screen, speakers, buttons, knobs, keypads, microphone, and so on for providing information to, and receiving information from, the occupant. The instrument panel may support vehicle controls, including a steering wheel 44 for controlling the pointing direction of wheels of the vehicle 20. The bulkhead 42 may include an outer surface that faces the passenger cabin 36. The outer surface may be a class-A surface, i.e., a finished surface exposed to view by a customer and free of unaesthetic blemishes and defects.

One or more seat assemblies 24, 46 may be supported in the passenger cabin 36, e.g., supported by and fixed to the floor of the vehicle 20. For example, the first seat assembly 24 may be supported at a first side of the vehicle 20 and a second seat assembly 46 may be supported at a second side of the vehicle 20. The first side and the second side of the vehicle 20 may be arranged along the vehicle-lateral axis A1. For example, the first side may be the left side 38 and the second side may be the right side 40 of the vehicle 20. The first side of the vehicle 20 may be a driver side. For example, the steering wheel 44 may be supported at the first side of the vehicle 20.

Each of the seat assemblies 24, 46 includes a seatback 48 and a seat bottom 50 that can support an occupant of the respective seat assembly 24, 46. For example, the occupant may sit atop a top surface of the seat bottom 50 and recline against the seatback 48. The seatback 48 and the seat bottom 50 can each include a frame. The frames may include tubes, beams, etc. The frames may be of any suitable plastic material, e.g., carbon fiber reinforced plastic (CFRP), glass fiber-reinforced semi-finished thermoplastic composite (organosheet), etc. As another example, some or all components of the frames may be formed of a suitable metal, e.g., steel, aluminum, etc. The seatback 48 and/or the seat bottom 50 can include a covering. The covering may include upholstery and padding. The upholstery may be cloth, leather, faux leather, or any other suitable material. The upholstery may be stitched in panels around the frames. The padding may be between the upholstery and the frame. The padding may be foam or any other suitable material. The seatback 48 may be stationary or movable relative to the seat bottom 50. The seatback 48 and the seat bottom 50 may be adjustable in multiple degrees of freedom. Specifically, the seatback 48 and the seat bottom 50 may themselves be adjustable, in other words, adjustable components within the seatback 48 and/or the seat bottom 50, and/or may be adjustable relative to each other.

Each of the seat assemblies 24, 46 defines a seat forward direction SD1, SD2. For example, the first seat assembly 24 defines the first seat-forward direction SD1 and the second seat assembly 46 defines a second seat-forward direction SD2. The seat-forward direction SD1, SD2 is a facing direction of the respective seat assembly 24, 46, e.g., the direction in which an occupant faces when seated on the respective seat bottom 50 looking straight ahead with the back of the occupant against the respective seatback 48. The seat bottom 50 of the respective seat assembly 24, 46 extends in the seat-forward direction SD1, SD2 from the seatback 48 of such seat assembly 24, 46. For example, the seat bottom 50 of the first seat assembly 24 extends in the first seat-forward direction SD1 from the seatback 48 of the first seat assembly 24, and the seat bottom 50 of the second seat assembly 46 extends in the second seat-forward direction SD2 from the seatback 48 of the second seat assembly 46.

The bulkhead 42 may be forward of the first seat assembly 24 in the first seat-forward direction SD1 and may be forward of the second seat assembly 46 in the second seat-forward direction SD2. In other words, one or both of the seat assemblies 24, 46 may face the bulkhead 42. For example, the bulkhead 42 may be in front of the seat assemblies 24, 46 along the vehicle-longitudinal axis A2 and the seat assemblies 24, 46 may face the front of the vehicle 20.

The middle console 26 of the vehicle 20 is adjacent, i.e., next to, the seat assemblies 24, 46. The middle console 26 is between the first seat assembly 24 and the second seat assembly 46, e.g., along the vehicle-lateral axis A1. The middle console 26 may be on a longitudinal midline M of the vehicle 20. In other examples, the middle console 26 assembly 22 may be in the middle of two adjacent seat assemblies 24, 46, e.g., the first seat assembly 24 and the second seat assembly 46, and offset from the longitudinal midline M of the vehicle 20 (not shown). The middle console 26 may be elongated along the vehicle-longitudinal axis A2. The middle console 26 may include an armrest, cupholders, etc.

The vehicle 20 includes one or more airbags, e.g., the first airbag 28, the second airbag 30, a third airbag 52, and/or a fourth airbag 54, for controlling kinematics of one or more occupants of the passenger cabin 36 during certain impacts to the vehicle 20. The airbags 28, 30, 52, 54 are each inflatable from uninflated positions to inflated positions. The airbags 28, 30, 52, 54 may each include panels of a woven polymer, or any other suitable material, that define inflation chambers that can receive inflation medium to inflate the respective airbag 28, 30, 52, 54 to the inflated position. As one example, the airbags 28, 30, 52, 54 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The first airbag 28 and the third airbag 52 at the uninflated positions are shown in FIGS. 1 and 3. The first airbag 28 and the third airbag 52 at the inflated positions are shown in FIG. 2. The first airbag 28 is supported by the first seat assembly 24 in the uninflated position and the inflated position. The third airbag 52 may be supported by the second seat assembly 46 in the uninflated position and the inflated position. The first airbag 28 may be supported by the seatback 48 of the first seat assembly 24 in the uninflated position and the inflated position, i.e., the weight of the first airbag 28 is borne by the seatback 48 of the first seat assembly 24 in the uninflated position and the inflated position. The third airbag 52 may be supported by the seatback 48 of the second seat assembly 46 in the uninflated position and the inflated position, i.e., the weight of the third airbag 52 is borne by the seatback 48 of the second seat assembly 46 in the uninflated position and the inflated position. The first airbag 28 and the third airbag 52 may be fixed to the frames of the seatbacks 48 of the first seat assembly 24 and the second seat assembly 46, e.g., via fastener, bracket, airbag housing, etc. The first airbag 28 and the third airbag 52 may be at vehicle-inboard sides of the seatbacks 48, e.g., adjacent the middle console 26. The first airbag 28 and the third airbag 52 in the uninflated positions may be internal the coverings of the seatbacks 48. The first airbag 28 and the third airbag 52 in the inflated positions may be external the covering the seatbacks 48, e.g., extending forward from the seatbacks 48 along the middle console 26.

The second airbag 30 and the fourth airbag 54 at the uninflated positions are shown in FIGS. 1 and 2. The second airbag 30 and the fourth airbag 54 at the inflated positions are shown in FIG. 3. The second airbag 30 in the uninflated position and the inflated position may be forward of the first seat assembly 24 in the first seat-forward direction SD1. The fourth airbag 54 in the uninflated position and the inflated position may be forward of the second seat assembly 46 in the second seat-forward direction SD2. For example, the second airbag 30 may be directly in front of the first seat assembly 24 and the fourth airbag 54 may be directly in front of the second seat assembly 46. The second airbag 30 and the fourth airbag 54 may be supported by, e.g., fixed to, the bulkhead 42, in the uninflated positions and the inflated positions. The second airbag 30 and the fourth airbag 54 may be supported by the middle console 26 (not shown), or other suitable structure.

The second airbag 30 and the fourth airbag 54 may be knee airbags, i.e., configured to control kinematics of knees of an occupant of the respective seat assembly 24, 46. The second airbag 30 in the inflated position may control kinetics of knees of an occupant of the first seat assembly 24. The fourth airbag 54 in the inflated position may control kinetics of knees of an occupant of the second seat assembly 46. The second airbag 30 and the fourth airbag 54 in the inflated positions may extend along the vehicle-vertical axis from above to below a top surface of the seat bottom 50 and may be disposed between the bulkhead 42 and the seat bottom 50 of the respective seat assembly 22, 46. The second airbag 30 in the inflated position may be below the steering wheel 44, e.g., along the vehicle-vertical axis.

The vehicle 20 may include one or more airbags (not shown) in addition to the first airbag 28, the second airbag 30, the third airbag 52, and the fourth airbag 54, e.g., front airbags, curtain airbags, etc.

The inflator 32 is included to provide inflation medium, e.g., to one or more of the airbags 28, 30, 52, 54. The inflator 32 may be, for example, a pyrotechnic inflator that uses a chemical reaction to drive inflation medium. The inflator 32 may be of any suitable type, for example, a cold-gas inflator. The inflator 32 may provide sufficient inflation medium to inflate, e.g., both the first airbag 28 and the third airbag 52 or both the second airbag 30 and the fourth airbag 54 to the inflated positions. The inflator 32 is supported by the middle console 26. For example, the inflator 32 may be supported by the middle console 26, i.e., the weight of the inflator 32 is borne by the middle console 26 in such examples. The inflator 32 may be fixed to the middle console 26, e.g., via fastener, bracket, and/or other structure.

The inflator 32 is operatively connected to the first airbag 28, the second airbag 30, the third airbag 52, and/or the fourth airbag 54 to provide inflation medium. In other words, the inflator 32 may be connected such that inflation medium from the inflator 32 can be directed to the inflation chambers of the first airbag 28, the second airbag 30, the third airbag 52, and/or the fourth airbag 54. For example, the inflator 32 may be operatively connected to the first airbag 28, the second airbag 30, the third airbag 52, and/or the fourth airbag 54 via a valve 56, fill tubes 58, and/or other suitable structure.

Figure 4:
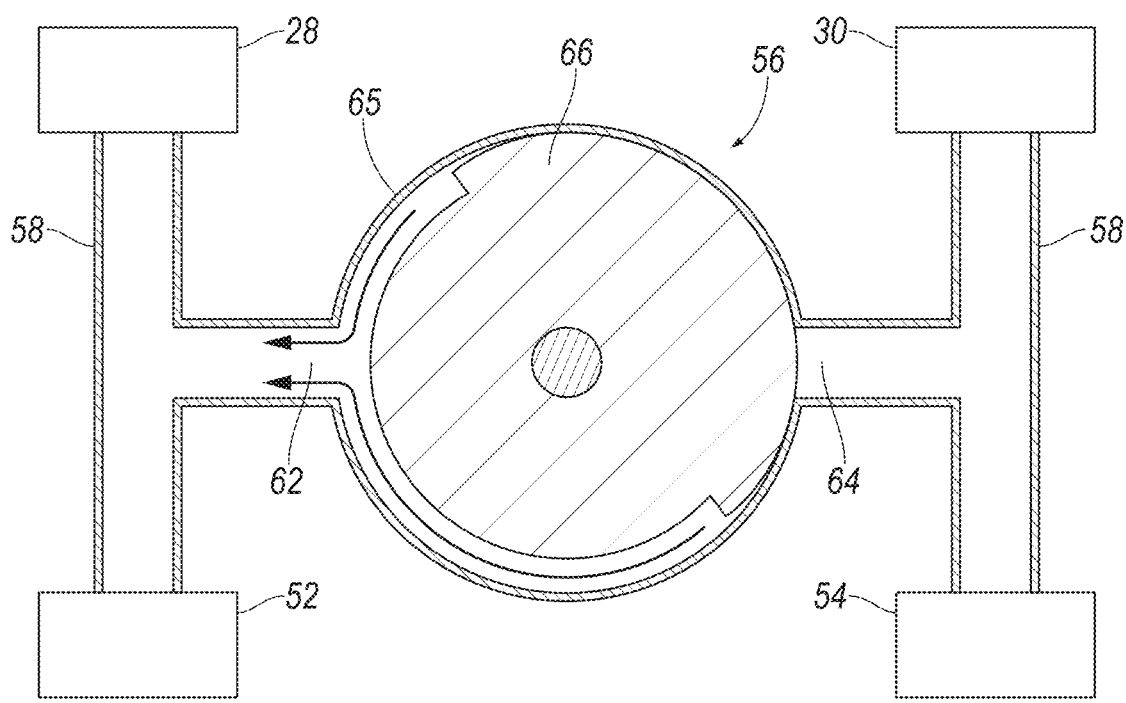
FIG. 4 is a top cross section view of a valve in a first position that directs inflation medium to the first airbag and the third airbag.
Figure 5:
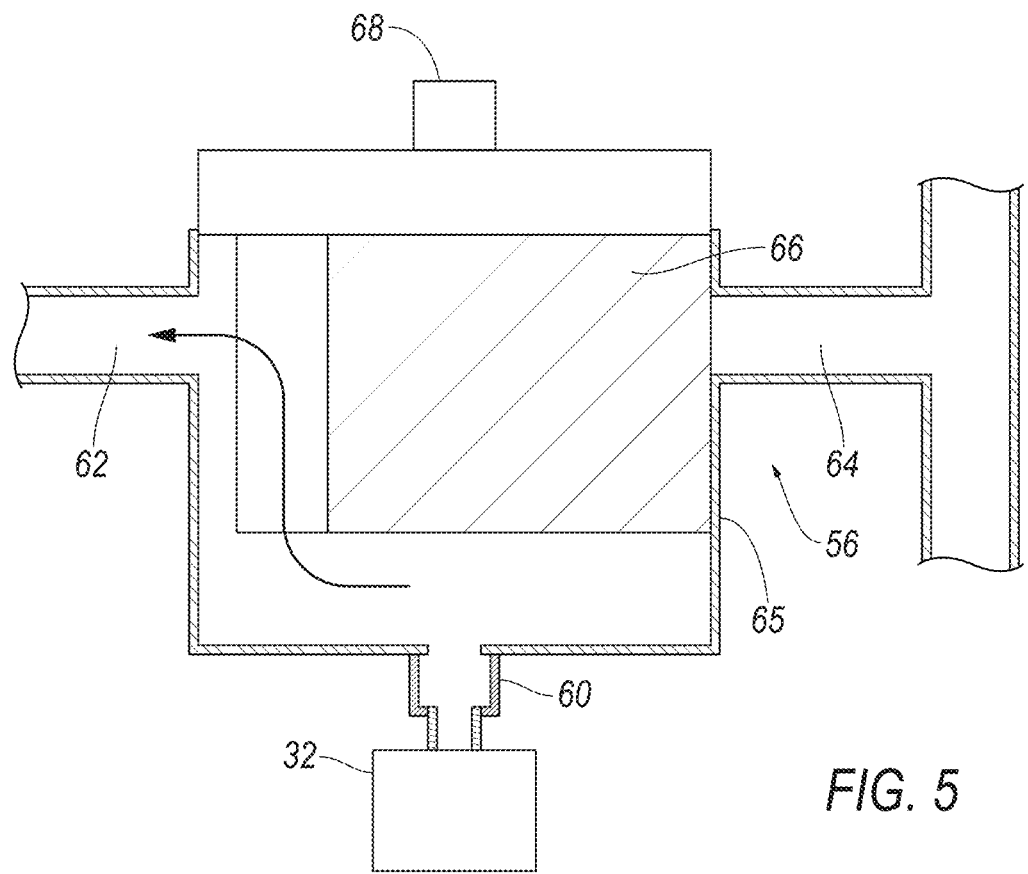
FIG. 5 is a side cross section view of the valve in the first position that directs inflation medium to the first airbag and the third airbag.
Figure 6:
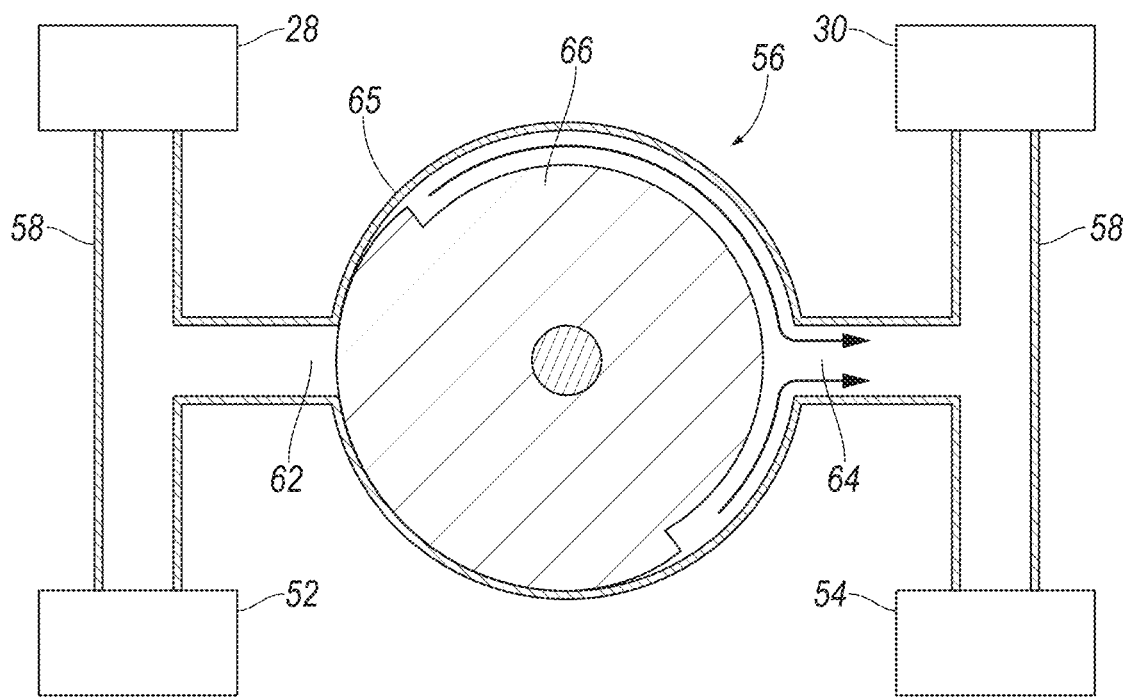
FIG. 6 is a top cross section view of the valve in a second position that directs inflation medium to the second airbag and the fourth airbag.
Figure 7:
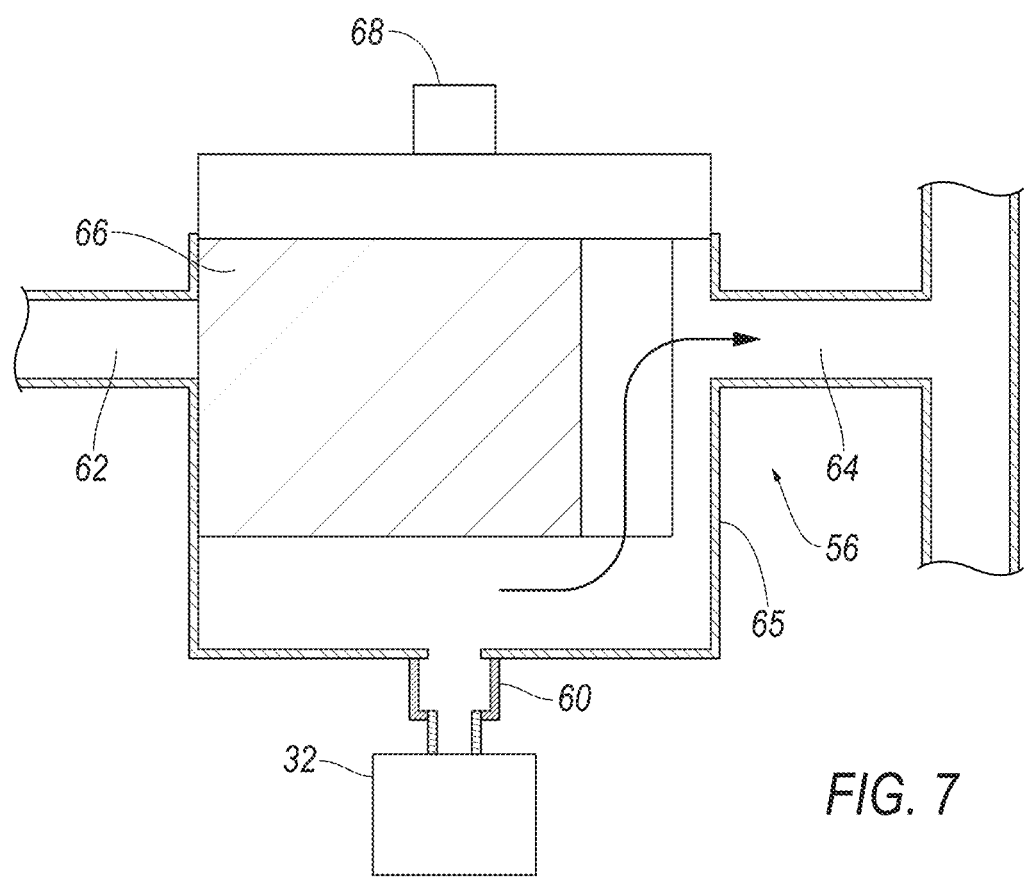
FIG. 7 is a side cross section view of the valve in the second position that directs inflation medium to the second airbag and the fourth airbag.

The valve 56 is included in the assembly 22 to selectively direct inflation medium to the airbags 28, 30, 52, 54. The valve 56 is operatively connected between the inflator 32 and the first airbag 28, the second airbag 30, the third airbag 52, and the fourth airbag 54 to receive inflation medium from the inflator 32 and direct the inflation medium to some of the airbags 28, 30, 52, 54 and not others. The valve 56 is movable from a first position, e.g., shown in FIGS. 4 and 5, to a second position, e.g., shown in FIGS. 6 and 7. In the example shown in the Figures, the valve 56 at the first position fluidly connects the inflator 32 and the first airbag 28 and the third airbag 52 such that inflation medium can flow from the inflator 32 to the first airbag 28 and the third airbag 52 to inflate the first airbag 28 and/or the third airbag 52 to the inflated positions. In the example shown in the Figures, the valve 56 at the first position fluidly disconnects the inflator 32 and the second airbag 30 and the fourth airbag 54 such that inflation medium is inhibited from flowing from the inflator 32 to the second airbag 30 and/or the fourth airbag 54. In the example shown in the Figures, the valve 56 at the second position fluidly connects the inflator 32 and the second airbag 30 and/or the fourth airbag 54 such that inflation medium can flow from the inflator 32 to the second airbag 30 and/or the fourth airbag 54 to inflate second airbag 30 and/or the fourth airbag 54 to the inflated positions. In the example shown in the Figures, the valve 56 at the second position fluidly disconnects the inflator 32 and the first airbag 28 and/or the third airbag 52 such that inflation medium is inhibited from flowing from the inflator 32 to the first airbag 28 and/or the third airbag 52.

With reference to FIGS. 4-7, the valve 56 may be a three-way valve, e.g., having an inlet port 60, a first outlet port 62, and a second outlet port 64. In such an example, the valve 56 in the first position permits fluid flow from the inlet port 60 to the first outlet port 62 and inhibits fluid flow from the inlet port 60 to the second outlet port 64. The valve 56 in the second position permits fluid flow from the inlet port 60 to the second outlet port 64 and inhibits fluid flow from the inlet port 60 to the first outlet port 62. The valve 56 may include a housing 65 and a body 66 disposed therein. The housing 65 may include the inlet port 60, the first outlet port 62 and the second outlet port 64. In the example shown in the Figures, the inlet port 60 is at a bottom of the housing 65 and the first outlet port 62 and the second outlet port 64 is at sides of the housing 65. The body 66 is spaced from the bottom and the inlet port 60. The body 66 is rotatable within the housing to the first position and the second position. The body 66 in the first position may block the second outlet port 64. The body 66 in the second position may block the first outlet port 62. In other examples, the valve 56 may include any other suitable structure, e.g., a ball valve, a gate valve, etc.

In the example shown in the Figures, the inflator 32 is connected to the inlet port 60. The first airbag 28 and the third airbag 52 are connected to the first outlet port 62. The second airbag 30 and the fourth airbag 54 are connected to the second outlet port 64, e.g., via fill tubes 58 or other suitable structure. The fill tubes 58 may be of sufficient length to permit movement of the first seat assembly 24 and the second seat assembly 46, e.g., relative to the vehicle body 34 along the vehicle-longitudinal axis A2 and the vehicle-vertical axis. The fill tubes 58 may be, for example, braided metal tubes or any other suitable material.

The assembly 22 may include an actuator 68 operatively coupled to the valve 56 to move the valve 56 to the first position or the second position, e.g., in response to a command from a computer 70. The actuator may provide linear force and/or rotational force (i.e. torque). For example, the actuator 68 may include a motor. The motor may be rotatably coupled to the body 66 of the valve 56, i.e., such that torque generated by the motor can rotate the body 66 relative to the housing 65. The motor may be rotably coupled to the body 66, e.g., via reduction gears (not shown) or any suitable structure. The actuator 68 may include a position sensor (not shown) configured to detect the position of the body, e.g., for feedback control of the motor. The actuator 68 may include any other suitable structure for moving the valve 56 from one position to another. For example, the actuator 68 may include a servo, an electro-magnetic solenoid and plunger, etc. The actuator 68 may be supported by, e.g., fixed to, the housing of the valve 56 or any other suitable structure. The actuator 68 may be a component of the valve 56.

Figure 8:
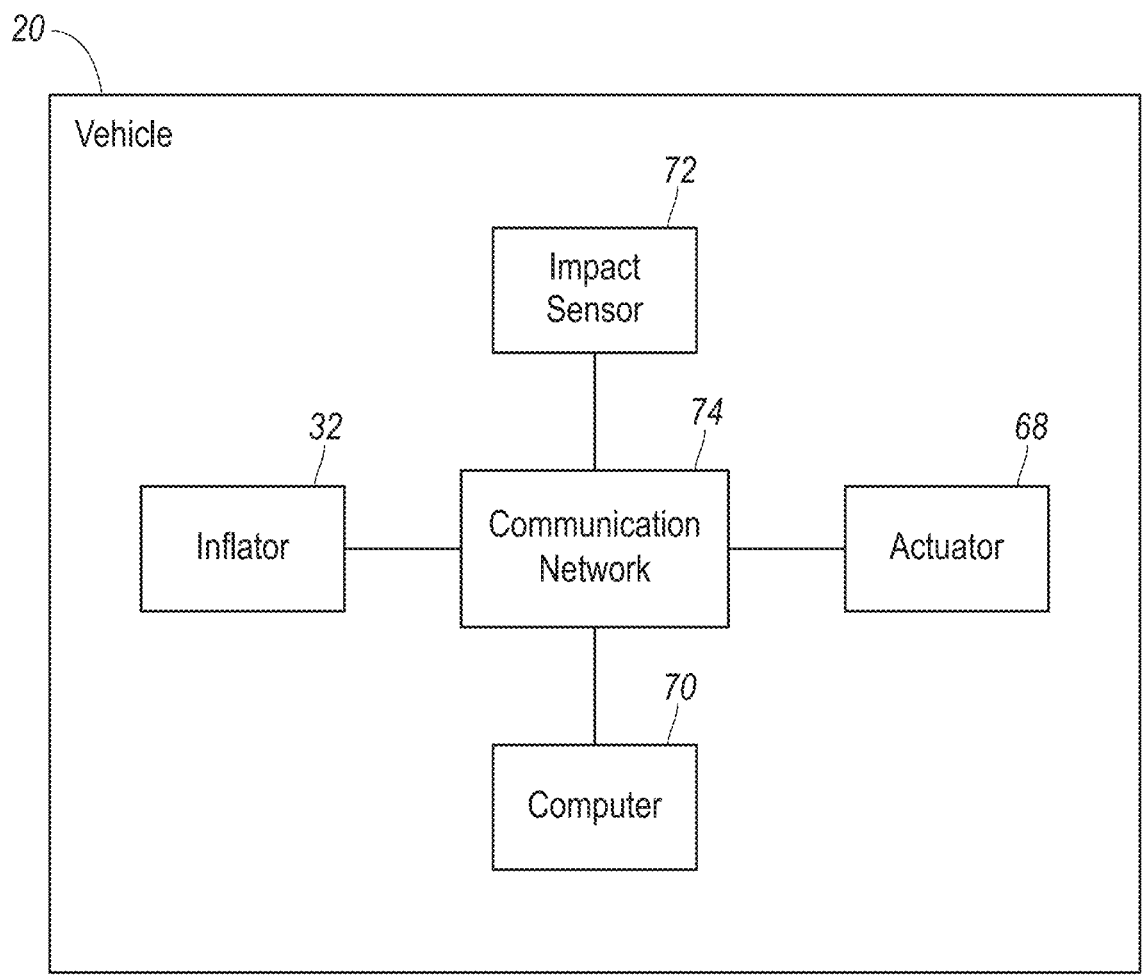
FIG. 8 is a block diagram of components of the vehicle.

With reference to FIG. 8, the vehicle 20 may include one or more impact sensors 72 configured to detect potential certain impacts to the vehicle 20 and certain impacts to the vehicle 20. A "certain impact" is an impact of the type and/or magnitude for which inflation of one or more of the airbags 28, 30, 52, 54 is designed i.e., "certain" indicates the type and/or magnitude of the impact. The type and/or magnitude of such "certain impacts" may be pre-stored in the computer 70, e.g., a restraints control module and/or a body control module. Detection of a "potential certain impact" includes detection of the potential of a certain impact. "Potential" means that the certain impact is more likely than not to occur. For example, detection of a "potential certain impact" indicates that the "certain impact" will occur unless the vehicle 20 or detected object (such as another vehicle) changes speed, trajectory, acceleration, etc. The impact sensors 72 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensors 72 may be located at numerous points in or on the vehicle 20.

The vehicle 20 may include a communication network 74. The communication network 74 includes hardware, such as a communication bus, for facilitating communication among vehicle components, e.g., the inflator 32, the actuator 68, the computer 70, the impact sensors 72, etc. The communication network 74 may facilitate wired or wireless communication among the vehicle components in accordance with a number of communication protocols such as controller area network (CAN), Ethernet, WiFi, Local Interconnect Network (LIN), and/or other wired or wireless mechanisms. Alternatively or additionally, in cases where the computer 70 comprises a plurality of devices, the communication network 74 may be used for communications between devices represented as the computer 70 in this disclosure.

The computer 70 may be a microprocessor-based computer implemented via circuits, chips, or other electronic components. The computer 70 includes a processor, a memory, etc. The memory of the computer 70 includes memory for storing programming instructions executable by the processor as well as for electronically storing data and/or databases. For example, the computer 70 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 70 may be a restraints control module. In another example, computer 70 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 70. The memory can be of any type, e.g., hard disk drives, solid state drives, servers, or any volatile or non-volatile media. The memory can store the collected data sent from the sensors.

The computer 70 is programmed to, i.e., the memory stores instructions executable by the processor to, detect a potential certain impact to the vehicle 20. The computer 70 may detect potential certain impacts to the front of the vehicle 20, to the side of the vehicle 20, etc. The computer 70 may detect potential certain impacts based on information received from the impact sensors 72, e.g., via the communication network 74. The computer 70 may detect potential certain impacts, e.g., with image recognition, object detection, trajectory prediction, threat probability analysis, and/or other analysis techniques.

The computer 70 is programmed to detect a certain impact to the vehicle 20. The computer 70 may detect certain impacts to the front of the vehicle 20, to the side of the vehicle 20, etc. The computer 70 may detect certain impacts based on information received from the impact sensors 72, e.g., via the communication network 74. The computer 70 may detect certain impacts based on detecting a force of a certain magnitude or direction applied to a certain area of the vehicle 20, based on detecting a certain acceleration or jerk of the vehicle 20, and/or other analysis techniques.

The computer 70 is programmed to move the valve 56 to the first position or the second position. The computer 70 may move the valve 56 to the first position or the second position by, for example, transmitting a command to the actuator 68 via the communication network 74. The command may specify the first position or the second position. The command may specify rotation, extension, retraction, etc., of the actuator 68 to a certation position that causes movement of the valve 56 to the first position or the second position.

The computer 70 may move the valve 56 to the first position or the second position based on detection of a potential certain impact to of the vehicle 20. For example, the computer 70 may move the valve 56 to the second position in response to detection of a potential certain impact to the front of the vehicle 20. As another example, the computer 70 may move the valve 56 to the first position in response to detection of a potential certain impact to the side, e.g., the right side 40 or the left side 38, of the vehicle 20.

The computer 70 may move the valve 56 to the first position when a condition is met and in the absence of detection of a certain impact to the front of the vehicle 20. A condition is a state of the vehicle 20, a state of the environment around the vehicle 20, an occurrence of a specific event, and/or a non-occurrence of a specific event that is detectable and/or knowable by the computer 70. For example, the condition may include passage of a predetermined period of time after the potential certain impact to the front of the vehicle 20 is detected. The predetermined period of time after the potential certain impact to the front of the vehicle 20 is detected may be an amount of time sufficient to indicate a detected potential certain impact did not result in a certain impact. In other words, the predetermined period of time may be an amount of time sufficient to determine, e.g., based on data from the impact sensors, that a detected potential certain impact will not occur. The predetermined period of time may be, e.g., 3 seconds. The predetermined period of time may be prestored in memory of the computer 70.

The computer 70 is programmed to actuate the inflator 32 to provide inflation medium. The computer 70 may actuate the inflation by transmitting a command, such as an electrical pulse, to the inflator 32. The command may, for example, initiate a chemical reaction that drives inflation medium and/or release pressurized inflation medium. The computer 70 may actuate the inflator 32 to provide inflation medium when the valve 56 is at the first position or the second position, e.g., without moving the valve 56 between detecting a potential certain impact and the certain impact. The computer 70 may actuate the inflator 32 to provide inflation medium after moving the valve 56 to the first position or the second position. The computer 70 may actuate the inflator 32 to provide inflation medium in response to detection of a certain impact to the vehicle 20, e.g., to the front of the vehicle 20, to the side of the vehicle 20, etc.

Figure 9:
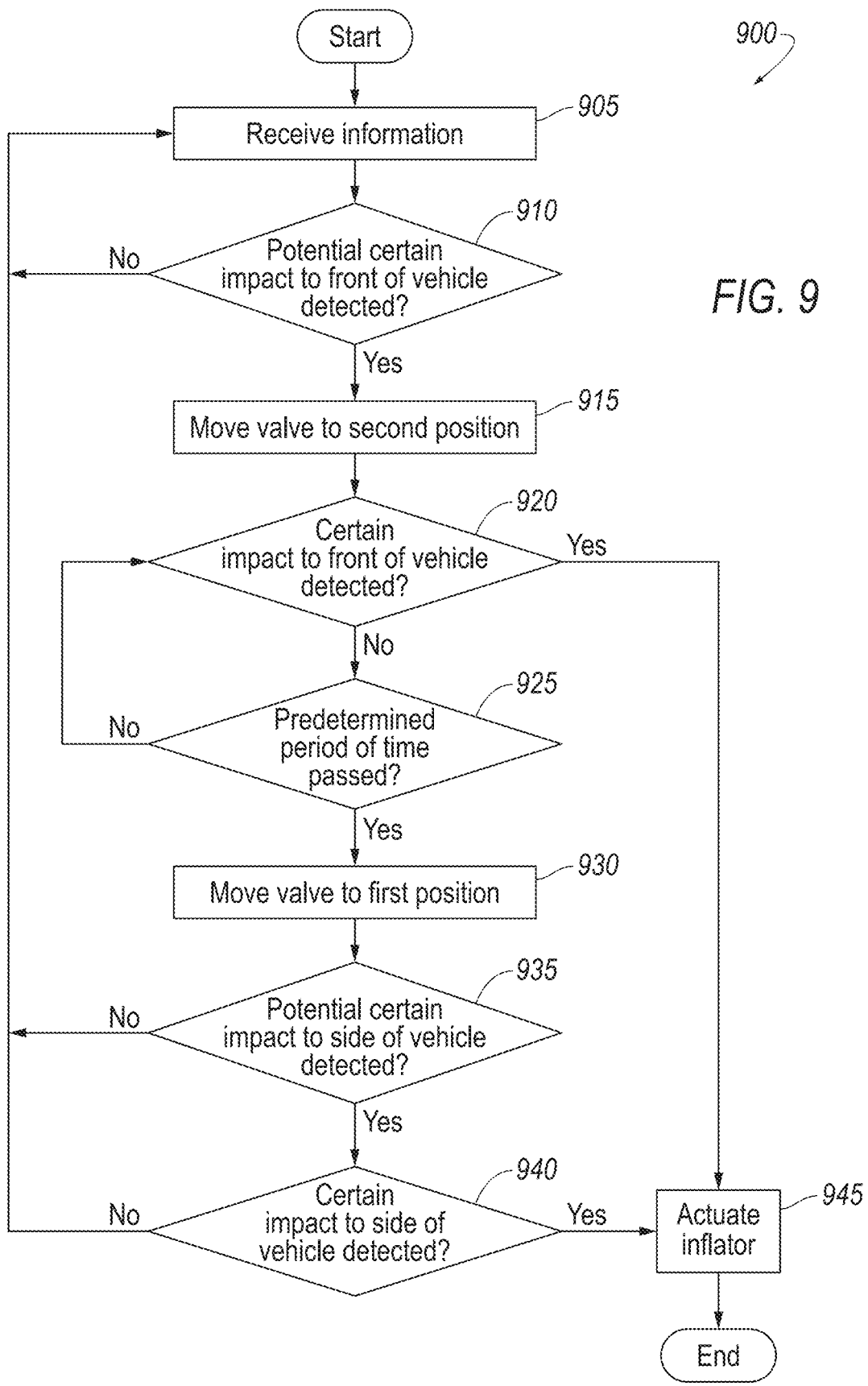
FIG. 9 is a flow chart showing a process for controlling the valve and the airbags.

FIG. 9 is a process flow diagram illustrating an exemplary process 900 for controlling the assembly 22 and selectively inflating the airbags 28, 30, 52, 54. The process 900 may be executed according to instructions stored in the memory and executable by the processor of the computer 70. The valve 56 may initially be at the first position. In other words, the valve 56 may be at the first position upon initiation of the process 900.

The process begins in block 905 in which the computer 70 receives information, e.g., from the impact sensors 72 and via the communication network 74. The computer 70 may continue to receive information throughout the process 900. "Throughout the process 900" in the present context means substantially continuously or at time intervals, e.g., every 5 milliseconds.

Next, at block 910 the computer 70 determines whether a potential certain impact to the front of the vehicle 20 is detected, e.g., based on information received from the impact sensors 72 and as described herein. In response to detection of a certain impact to the front of the vehicle 20, the computer 70 moves to block 915. In response to not detecting a potential certain impact to the front of the vehicle 20, the computer 70 may return to block 905.

At block 915 the computer 70 moves the valve 56 to the second position. For example, the computer 70 may send a command to the actuator 68 via the communication network 74 and as described herein.

Next, at block 920 the computer 70 determines whether a certain impact to the front of the vehicle 20 is detected, e.g., based on information received from the impact sensors 72 and as described herein. In response to detection of a certain impact to the front of the vehicle 20 the computer 70 moves to block 945. In response to not detecting a certain impact to the front of the vehicle 20 the computer 70 may move to block 925.

At block 925 the computer 70 determines whether a predetermined period of time has passed since detecting the potential certain impact at block 910. The computer 70 may, for example, compare an amount of time that has lapsed since the determination at block 920 with the predetermined period of time. The computer 70 may determine the amount of time that has lapsed with an internal clock of the computer 70. In response to determining the predetermined period of time has passed the computer 70 moves to block 930. In response to determining the predetermined period of time has not passed the computer 70 returns to block 920.

At block 930 the computer 70 moves the valve 56 to the first position. For example, the computer 70 may send a command to the actuator 68 via the communication network 74 and as described herein.

At block 935, with the valve 56 at the first position, the computer 70 determines whether a potential certain impact to the side of the vehicle 20 is detected, e.g., based on information received from the impact sensors 72 and as described herein. In response to detection of a potential certain impact to the side of the vehicle 20 the computer 70 maintains the valve 56 at the first position and moves to block 940. The computer 70 may maintain the valve 56 at the first position by, for example, refraining from commanding the valve 56 to the second position, refraining from commanding the valve 56 away from the first position, commanding the valve 56 the first position based on feedback received from one of more sensors, etc. In response to not detecting a potential certain impact to the front of the vehicle 20 the computer 70 may return to block 905.

At block 940 the computer 70 determines whether a certain impact to the side of the vehicle 20 is detected, e.g., based on information received from the impact sensors 72 and as described herein. In response to detection of a certain impact to the front of the vehicle 20 the computer 70 moves to block 945. In response to not detecting a certain impact to the front of the vehicle 20 the computer 70 may return to block 905.

At block 945 the computer 70 actuates the inflator 32 to provide inflation medium, e.g., by transmitting a command to the inflator 32 via the communication network 74 as described herein. After block 945 the process 900 may end.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The numerical adjectives "first," "second," etc., are used herein merely as identifiers and do not signify order or importance. Use of "in response to," "based on," and "upon" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly, comprising:
a seat assembly defining a seat-forward direction;
a middle console adjacent the seat assembly;

a first airbag inflatable from an uninflated position to an inflated position, the first airbag supported by the seat assembly in the uninflated position and the inflated position;

a second airbag inflatable from an uninflated position to an inflated position, the second airbag in the uninflated position and the inflated position being forward of the seat assembly in the seat-forward direction; and an inflator supported by the middle console, the inflator operatively connected to the first airbag and the second airbag to provide inflation medium.

2. The assembly of claim 1, further comprising a valve operatively connected between the inflator and the first airbag and the second airbag, the valve being movable from a first position that fluidly connects the inflator and the first airbag to a second position that fluidly connects the inflator and the second airbag.

3. The assembly of claim 2, wherein the valve at the first position fluidly disconnects the inflator and the second airbag.

4. The assembly of claim 3, wherein the valve at the second position fluidly disconnects the inflator and the first airbag.

5. The assembly of claim 4, further comprising a computer having a processor and a memory storing instructions executable by the processor to move the valve to the first position or the second position, and to actuate the inflator to provide inflation medium.

6. The assembly of claim 5, wherein the valve is initially at the first position and the memory stores instructions executable by the processor to, in response to detection of a potential certain impact to a front of a vehicle, move the valve to the second position.

7. The assembly of claim 6, wherein the memory stores instructions executable by the processor to move the valve to the first position when a condition is met and in the absence of detection of a certain impact to the front of the vehicle.

8. The assembly of claim 7, wherein the condition includes passage of a predetermined period of time after the potential certain impact to the front of the vehicle is detected.

9. The assembly of claim 6, wherein the memory stores instructions executable by the processor to, after moving the valve to the second position, actuate the inflator to provide inflation medium in response to detection of a certain impact to the front of the vehicle.

10. The assembly of claim 6, wherein the memory stores instructions executable by the processor to, in response to detection of a potential certain impact to a side of the vehicle, maintain the valve at the first position.

11. The assembly of claim 10, wherein the memory stores instructions executable by the processor to, with the valve at the first position, actuate the inflator to provide inflation medium in response to detection of a certain impact to the side of the vehicle.

12. The assembly of claim 2, further comprising an actuator operatively coupled to the valve to move the valve to the first position or the second position.

13. The assembly of claim 1, further comprising a bulkhead forward of the seat assembly in the seat-forward direction, the second airbag supported by the bulkhead in the uninflated position and the inflated position.

14. The assembly of claim 1, wherein the second airbag is a knee airbag.

15. The assembly of claim 1, wherein the seat assembly includes a seat bottom and a seatback, the first airbag supported by the seatback in the uninflated position and the inflated position.

16. The assembly of claim 1, further comprising a second seat assembly adjacent the middle console and a third airbag inflatable from an uninflated position to an inflated position, the third airbag supported by the second seat assembly in the uninflated position and the inflated position, and wherein the inflator is operatively connected to the third airbag to provide inflation medium.

17. The assembly of claim 16, wherein the second seat assembly defines a second seat-forward direction, and further comprising a fourth airbag inflatable from an uninflated position to an inflated position, the fourth airbag in the uninflated position and the inflated position forward of the second seat assembly in the second seat-forward direction.

18. The assembly of claim 17, further comprising a valve operatively connected between the inflator and the first airbag, the second airbag, the third airbag, and the fourth airbag, the valve movable from a first position that fluidly connects the inflator and the first airbag and the third airbag to a second position that fluidly connects the inflator and the second airbag and the fourth airbag.

* * * * *